US010983891B2

(12) United States Patent
Dadd et al.

(10) Patent No.: US 10,983,891 B2
(45) Date of Patent: Apr. 20, 2021

(54) METHOD AND SYSTEM FOR IMPLEMENTING A DATA CENTER OPERATING SYSTEM

(71) Applicant: JPMorgan Chase Bank, N.A., New York, NY (US)

(72) Inventors: Morgan Dadd, London (GB); Tom J. March, Richmond (GB); Christian Jones, Mistley (GB)

(73) Assignee: JPMorgan Chase Bank, N. A., New York, NY (US)

( * ) Notice: Subject to any disclaimer, the term of this patent is extended or adjusted under 35 U.S.C. 154(b) by 0 days.

(21) Appl. No.: 15/656,140

(22) Filed: Jul. 21, 2017

(65) Prior Publication Data
US 2018/0024700 A1   Jan. 25, 2018

Related U.S. Application Data

(60) Provisional application No. 62/364,981, filed on Jul. 21, 2016.

(51) Int. Cl.
*G06F 11/30* (2006.01)
*G06F 11/32* (2006.01)
(Continued)

(52) U.S. Cl.
CPC ........ *G06F 11/3058* (2013.01); *G06F 3/0481* (2013.01); *G06F 11/3006* (2013.01);
(Continued)

(58) Field of Classification Search
CPC .............. G06F 3/0481; G06F 11/3058; G06F 11/3062; G06F 11/3006; G06F 11/32;
(Continued)

(56) References Cited

U.S. PATENT DOCUMENTS 5,751,933 A * 5/1998 Dev ..................... G06F 11/2257
714/4.12
7,493,193 B2 * 2/2009 Hyland ............... G06F 11/3058
700/275

(Continued)

OTHER PUBLICATIONS

International Search Report and the Written Opinion of the International Searching Authority issued in PCT/US2017/043190 dated Oct. 6, 2017.

(Continued)

*Primary Examiner* — Justin R. Blaufeld
(74) *Attorney, Agent, or Firm* — Hunton Andrews Kurth LLP

(57) ABSTRACT

The invention relates to a Data Center Operating System. An embodiment of the present invention comprises: a memory component that stores inventory data for a plurality of data centers; an interactive interface that receives one or more user inputs; an API input that receives data from one or more data center systems; and a processor configured to perform the steps comprising: receiving, via the API input, monitored data from a plurality of data centers at one or more locations; automatically generating, via the processor, an interactive data center floorplan that comprises the monitored data at a device-level for a specific data center; and displaying, via the interactive interface, the interactive data center floorplan in one or more views wherein the one or more views comprises detailed data for a particular rack in the specific data center.

10 Claims, 5 Drawing Sheets

(51) Int. Cl.
*G06F 3/0481* (2013.01)
*G06N 5/02* (2006.01)
*G06Q 10/06* (2012.01)
*H04L 12/24* (2006.01)
*H04L 12/26* (2006.01)
*G06F 1/32* (2019.01)
*G06F 3/0484* (2013.01)

(52) U.S. Cl.
CPC .......... *G06F 11/3062* (2013.01); *G06F 11/32* (2013.01); *G06N 5/022* (2013.01); *G06Q 10/06* (2013.01); *H04L 41/22* (2013.01); *G06F 1/32* (2013.01); *G06F 3/04847* (2013.01); *H04L 43/045* (2013.01)

(58) Field of Classification Search
CPC .. G06Q 10/06; G06Q 10/06314; G06N 5/022; H04L 41/22
See application file for complete search history.

(56) References Cited

U.S. PATENT DOCUMENTS

| | | |
|---|---|---|
| 8,949,646 B1 | 2/2015 | Weber et al. |
| 2007/0038414 A1* | 2/2007 | Rasmussen ............. G06F 1/206 703/1 |
| 2011/0145657 A1* | 6/2011 | Bishop ................ G06F 11/3495 714/47.1 |
| 2011/0241833 A1 | 10/2011 | Martin et al. |
| 2014/0025968 A1 | 1/2014 | Khuti et al. |
| 2014/0026023 A1* | 1/2014 | Cabanier ............. G06F 16/9577 715/202 |
| 2014/0033069 A1* | 1/2014 | Chegini ................ G06F 40/169 715/751 |
| 2015/0109332 A1* | 4/2015 | Manzoni ................ G09G 5/377 345/629 |
| 2015/0338281 A1* | 11/2015 | Ross ........................ G01K 3/14 236/44 A |
| 2016/0093077 A1* | 3/2016 | Chardon ............... G06T 11/206 345/440 |
| 2016/0259630 A1* | 9/2016 | Roos ......................... G06F 8/35 |
| 2016/0283343 A1* | 9/2016 | Cattoen ............... G06F 11/3065 |
| 2017/0201425 A1* | 7/2017 | Marinelli ............. G06F 11/3051 |
| 2017/0353546 A1* | 12/2017 | Kimura ................. G06F 11/324 |

OTHER PUBLICATIONS

European Patent Office, European Patent Application No. 17831921.6, Communication with the Extended European Search Report, dated Nov. 13, 2019, pp. 1-3.
European Patent Office, European Patent Application No. 17831921.6, European Search Opinion, dated Nov. 8, 2019, pp. 1-6.

* cited by examiner

METHOD AND SYSTEM FOR IMPLEMENTING A DATA CENTER OPERATING SYSTEM

CROSS REFERENCE TO RELATED APPLICATIONS

The application claims priority to U.S. Provisional Application 62/364,981, filed Jul. 21, 2016, the contents of which are incorporated herein in its entirety.

FIELD OF THE INVENTION

The present invention generally relates to implementing and managing a data center operating system.

BACKGROUND OF THE INVENTION

For many of its core processes, Data center teams rely on a mix of large third-party applications and small custom-built tools. The maintenance cost of the vendor applications is high and the internal tools are often unsupported. Current systems are overly complex and result in poor performance due to the restrictive nature of the database architectures. Moreover, current systems are cumbersome with their dedicated database, dedicate workflow systems and other requirements.

These and other drawbacks exist.

SUMMARY OF THE INVENTION

Accordingly, one aspect of the invention is to address one or more of the drawbacks set forth above. According to an embodiment of the present invention, a computer implemented data center operating system comprises: a memory component that stores inventory data for a plurality of data centers; an interactive interface that receives one or more user inputs; an API input that receives data from one or more data center systems; and a processor, coupled to the API input, memory component and the interactive interface, the processor configured to perform the steps comprising: receiving, via the API input, monitored data from a plurality of data centers at one or more locations; automatically generating, via the processor, an interactive data center floorplan that comprises the monitored data at a device-level for a specific data center; and displaying, via the interactive interface, the interactive data center floorplan in one or more views wherein the one or more views comprises detailed data for a particular rack in the specific data center.

According to another embodiment of the present invention, a computer implemented method that operates a data center system comprises the steps of: receiving, via an API input, monitored data from a plurality of data centers at one or more locations; automatically generating, via a processor, an interactive data center floorplan that populates the floorplan with the monitored data; and displaying, via the interactive interface, the interactive data center floorplan in one or more views wherein the one or more views comprises detailed data for a particular rack in a particular data center; wherein the API input receives data from one or more data center systems; the interactive interface receives one or more user inputs; the processor is coupled to the API input, a memory component and the interactive interface.

The computer implemented system, method and medium described herein provide unique advantages to entities, organizations and other users, according to various embodiments of the invention. The innovative system and method facilitate management of data center operations and further provide unique tools to more accurately predict resource consumption and other functionality specific to data centers. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
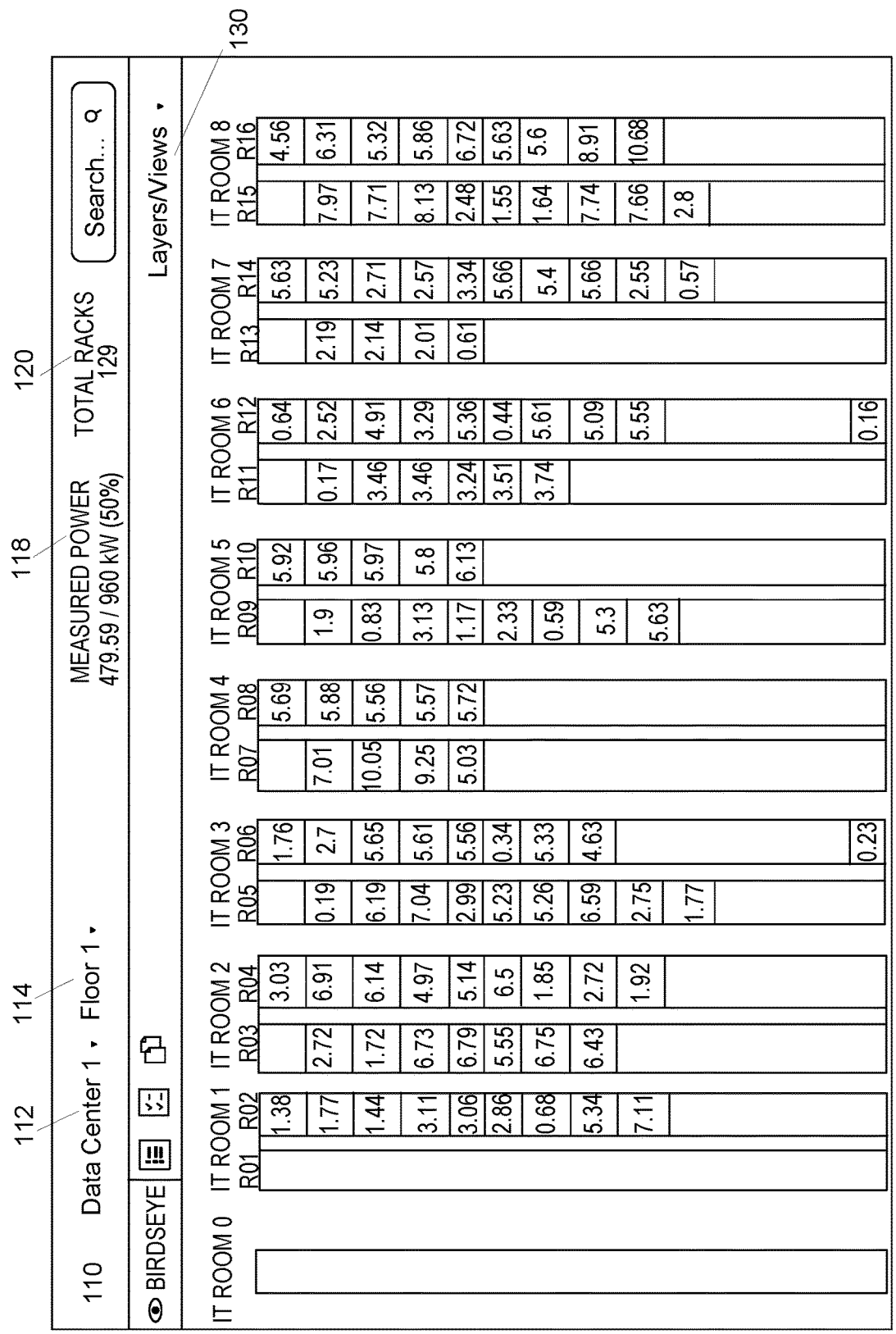
FIG. 1 is an exemplary user interface of a DCOS system that illustrates a bird's eye view of a data center space, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a Data Center Operating System (DCOS) to directly monitor load and optimize Data Center capacity. The innovative system manages capacity and power consumption in data centers at various locations and provides information concerning availability of data center housing as well as provisioning and capacity needs. An embodiment of the present invention is directed to an interactive DCOS Tool that brings together various modules and/or data feeds.

A data center generally refers to a facility used to house computer systems and associated components, such as telecommunications and storage systems. It generally includes redundant or backup power supplies, redundant data communications connections, environmental controls (e.g., air conditioning, fire suppression, etc.) and various security devices. A data center may occupy one or more rooms of a building, one or more floors, an entire building or multiple buildings. A data center houses equipment, such as servers that may be mounted in rack cabinets or other storage infrastructure. Racks are usually placed in rows forming corridors or aisles between them. This architecture allows individuals access to the front and rear of each cabinet. Oftentimes, servers and other equipment may differ greatly in size, some occupying many square feet of floor space.

According to an embodiment of the present invention, a DCOS Tool may be API-driven so that the tool inherits data from other sources, as well as publish to other applications (e.g., supply/demand management, inventory, data center management and other toolsets, etc.). The innovative system includes a management platform that consolidates data points from various repositories and sources, internal and external to an entity. An embodiment of the present invention is directed to a high level framework based around Application Programming Interfaces (APIs) so that various sources may effectively communicate with the DCOS Tool, effectively taking and receiving data from other systems and sources. The DCOS Tool provides a plug-and-play application that is flexible and sophisticated in its capabilities.

An embodiment of the present invention may be specific to a particular environment that visualizes data in a customized way for a particular service (e.g., data center teams, etc.) for key decision making. An embodiment of the present invention may be flexible to accommodate changes to data sources and allow the publishing of data to other internal applications.

According to an embodiment of the present invention, the DCOS Tool may be used to manage a strategic data center estate in line with an agreed Data Center Strategy which may encompass establishment of new facilities in various locations, e.g., North America, EMEA, Asia Pacific, etc.

An embodiment of the present invention is directed to a customized interactive user interface (UI) for data center teams that provides various views, e.g., a birds-eye view, rack view, etc., of one or more data centers. According to an exemplary embodiment, the present invention may be hosted on cloud-hosting platform and may further use Scalable Vector Graphics (SVG) and JavaScript to draw the equipment and make it searchable with data from databases, servers, and/or other sources, including Cassandra, SQL databases. A cloud hosting platform may include a user interface application, which may further include a Web application running atop an OS software stack. SVG may represent an XML-based vector image format for two-dimensional graphics with support for interactivity and animation. Other user interface applications may be implemented. An embodiment of the present invention is directed to dynamically generating equipment in a user's browser when a page is loaded, which means that users are not required to wait for a download. In contrast, current systems require offline processing, where information (e.g., images, etc.) are not available to a user until the next day or later. Accordingly, the DCOS Tool of an embodiment of the present invention provides advantages over current systems in terms of accuracy, speed and up-to-date data.

For example, the DCOS Tool may collect live power data from a plurality of racks and other sources. In this example, the system may draw heat maps and view that data and history in real-time. The system may be available via various devices, including a mobile device (e.g., smart phone, tablet, etc.) executing an application ("App") as well as desktop and other devices.

An embodiment of the present invention is directed to providing a software veneer to data center management to illustrate floor plans, rack elevations, inventory data, capacity analysis (including scenario planning), device placement automation, etc.

An embodiment of the present invention is directed to a single framework so that internal tools may be redeveloped onto it and new tools may be built. This foundation may form the cornerstone of future applications and so developing messaging and APIs will be fundamental. An embodiment of the present invention is directed to ensuring that tools are sufficiently consistent that they look like a single application to users but flexible enough that different users may separately build and add components.

An embodiment of the present invention may be used by various users, including data center team resources, customers, supply chain teams, etc. The system may provide such users with data including reservation information and lead times. The framework of an embodiment of the present invention allows for customers to view information both programmatically and via a user interface.

According to an embodiment of the present invention, the system provides a unified framework and a single data schema to get data from and send data to strategic tools thereby simplifying integration with other tools. An embodiment of the present invention is directed to an application framework that receives input from several data feeds (e.g., inventory, power monitoring and data center management tools, Cassandra, custom databases, etc.). The DCOS Tool is flexible enough to easily add future functionality as "modules"; easy to develop a new module and drop it in to the app to replace an older or vendor one; and implements a core API that different modules, users and reports can use. An embodiment of the present invention may rely on a number of key data dependencies, e.g., inventory, data center management and cabling tools. Moreover, the system may access several databases and extensive data collection processes.

The system may also include a visual and data template so that modules may follow the same or similar visual theme. The system may contain the ability to use permission groups. In addition, the system may avoid complex support issues. The creation and management of workflow using business logic may be easily supported. The system may be designed to be cloud native and may be hosted on any cloud platform that provides a javascript or similar environment. The system may further contain a central reporting database which may be accessible by both API and SQL queries; and contain highly documented and commented source code. Moreover, the system of an embodiment of the present invention may be self-healing in that it may perform auto restart services that have failed. The system may further have a globally distributed UI, API and database with geo-load balancing. Accordingly, users may be automatically directed to an appropriate environment.

Using a shared backbone of databases and services, the DCOS Tool may utilize a modular design so that internal tools may be replaced one-by-one over a long period. The DCOS Tool may replace a number of legacy vendor tools with modules designed around real processes, built on modern development frameworks and in an agile manner.

Each module may be developed in stages. For example, according to an exemplary illustration, initially only read-only features may be built out and tested by users. Features may then be upgraded to allow changes to the database until eventually the module may replace an existing tool (e.g., data center management and cabling toolsets, etc.). There may be a number of core modules in the DCOS Tool that sit on top of a core backbone, i.e., the API. For example, each screen and dashboard may be made up of different modules. During a development process, modules may be developed by different teams and work standalone (but integrated with a DCOS backbone). Other modules may also be provided by vendors and third parties, with the only development being integration.

FIG. 1 is an exemplary user interface of a DCOS system that illustrates a bird's eye view of a data center space, according to an embodiment of the present invention. An embodiment of the present invention is directed to data center operating system. For example, the system may be a cloud-native, API-enabled node.js application designed to be an innovative DCOS tool. Running on micro-services, the data center operating system may provide reporting, monitoring and data quality at strategic and non-strategic data centers and technology rooms. An embodiment of the present invention may be an API driven system integrated into other systems. For example, user interface features may be powered by a DCOS-API.

In addition, the system may support various types of user devices, including desktop, mobile, etc. For example, users may use tablets to access the various modules of the data center operating system to carry out day to day tasks. Other users may use an application running on a desktop to access larger more detailed views. For example, a user may be on the floor of a data center with a tablet (or other mobile device). By scanning a device on site, the DCOS Tool may identify the device and provide detailed measurements and other data relative to the scanned device.

According to an exemplary embodiment, the system may be developed on an internal cloud hosting platform which is based on the cloud foundry platform as a service. The DCOS Tool may generate the user interface using SVG—a JavaScript framework that is linked to a back-end cloud-based database. This feature enables users to drill-down into different components and access feeds from various other systems. The calculations and measurements are received directly from a live monitoring system that provides insights as to a current state of a particular device, rack, row or other group of devices at any point in time. Other variations may be implemented.

FIG. 1 illustrates how separate modules may integrate into an application framework. A Top bar 110 provides consistency across various views and includes features such as a site dropdown or a search and custom features relevant to the context of the current view (e.g., measured power, total racks, search bar, etc.).

An embodiment of the present invention is directed to auto-generating a responsive and interactive data center floorplan that may be drawn in SVG via a JSON object provided over an API. The innovative system provides responsiveness and interactive features for various users and applications.

An embodiment of the present invention is directed to populating real-time monitored data and representing it on any part of a floorplan. As shown in FIG. 1, an exemplary floorplan may include a plurality of IT rooms and rows of devices, represented by R01, R02, . . . R16. The monitored points may include any sensor data from an area or location, such as a building. Monitored data may include real-time power measured in kW, power recorded over an arbitrary period of time (e.g., kWh), electrical phase balance, power trending, local temperature/pressure/airflow readings.

An embodiment of the present invention is directed to generating the user interface based on an API that receives data from various sources. The DCOS Tool ties together a plurality of different data sources, performs calculations in real time and automatically generates the interactive interface.

The floorplan, illustrated in FIG. 1, may be searchable on a user interface (e.g., webpage) across various integrated data points. The DCOS Tool may also use live color layering and live data to provide various features, including providing search results and highlighting trends such as power utilization as well as dense/sparse areas of the data center. The DCOS Tool may also provide warning limits and breaches, e.g., if kW goes above a target set by the Recommendation Engine (below) of 70% of typical power usage of identically configured racks in other sites. The DCOS Tool further provides details concerning service and configuration. In addition, the DCOS Tool illustrates a future state of the data center, e.g. what will it look like in six months, how is power expected to grow and/or shrink, etc. The DCOS Tool further displays tickets/faults provided by external ticketing or error systems.

Various functions and operations (e.g., create, read, update, delete, etc.) may be directly performed from the floorplan by text input, keyboard changes or by drag- and drop that immediately updates the official database object.

An embodiment of the present invention provides changes and reads instantly due to an optimized combination of SVG, SQL and AngularJS.

As shown in FIG. 1, a bird's eye view may be presented for a particular data center location. Data Center name or identifier may be display at 112 and may include geographic locations, which may be represented as cities, states, countries, geographic area, etc. For example, an entity may maintain data centers in various locations, including cities, states, regions, such as Delaware, United Kingdom, Hong Kong, California and/or other geographic location. The location may include a specific area. A specific space within a data center may be displayed at 114. In this example, a specific floor of Data Center 1 has been selected. Other subsets or geographic boundaries may be identified. Each of the rows represents a room or other designated area. Drop-down menus (or other interactive graphic) allows for selection of other locations and data centers. Each block may represent one or more racks or other partition. The view may also include various levels—upper level, lower level, etc. Also, measurements may be provided including measured power (and percentage to capacity) 118 and total number of racks 120 for the selected location and area. As shown in FIG. 1, each block may represent a device (or devices) with corresponding power measurements. In this example, the power measurements are in kW. Other metrics may be provided, including temperature, airflow, pressure, etc.

Upon selection of a particular rack (or section), detailed information may be displayed via an interactive window or other graphic. For example, information may include inventory number, asset tag, grid, network zone, oldest device, rack pattern, monitored information, cable route, links, derate, average, maximum, kW expected and kW measured. The information displayed may be provided via an API in real-time or near real-time. A corresponding rack view may also be available. Derate generally refer to operating a device at less than its rated maximum capability.

Upon selection of a Room (or other predetermined subset), detailed information may be provided via an interactive window. For example, by selecting IT Room 3, a window may provide details concerning Installed Racks, Name, kW limit, Containment and kW measurements relating to derate, average, maximum. Other details may be provided.

An exemplary user interface may provide various views at 130, which may include No Color Layer, kW utilization, Install Status, Network Purpose, Service, Upcoming Installs, Cabling, etc. Other variations and views may be available.

In a kW utilization view example, each rack may display color, graphics and/or other codes representing varying degrees, such as a light color to indicate low kW, a medium color to indicate medium kW and a darker shade to indicate high kW. In this example, low, medium and high may be based on predetermined thresholds or ranges. According to another example, low, medium and high may be based on measurements so that ⅓ is allotted to low, another third is allotted to medium and the final third is allotted to high.

Additional gradients may be provided to illustrate additional levels and intensity (e.g., low, low-medium, medium, medium-high and high). Various graphics, codes and variations may be implemented.

For example, other views may include Install Status, Network Purpose, Service, Upcoming Installs, etc. According to an exemplary embodiment, for Service, a user may select network, storage compute, etc.

Figure 2:
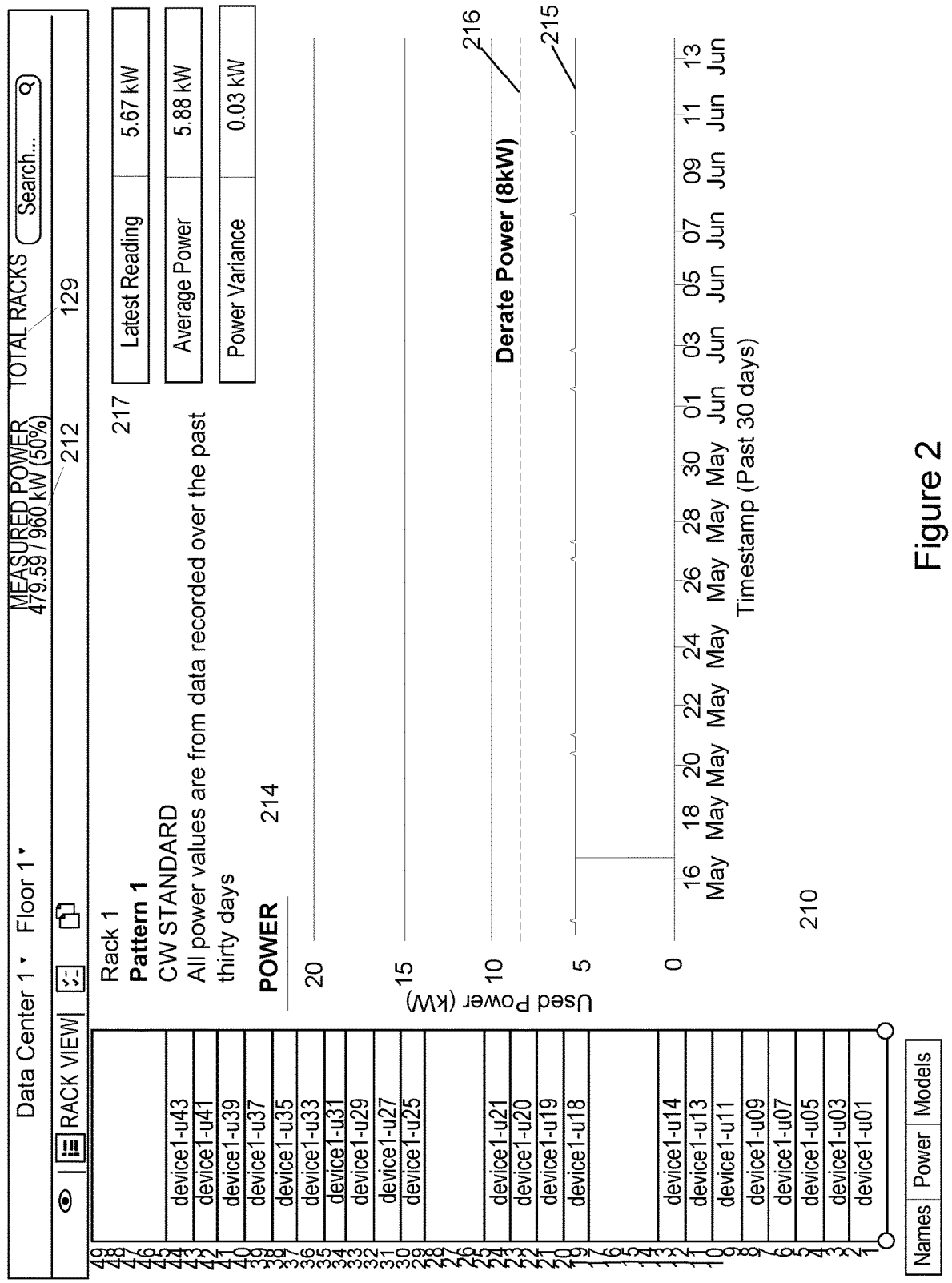
FIG. 2 is an exemplary user interface of a DCOS system that illustrates rack elevations and analytical information, according to an embodiment of the present invention.

FIG. 2 is an exemplary user interface of a DCOS system that illustrates rack elevations and analytical information, according to an embodiment of the present invention. FIG. 2 provides an illustration of a particular device, such as an appliance, server, etc. The device may be a specific rack identified as Rack 1 associated with Pattern 1. As shown in FIG. 2, 210 provides an illustration of a rack view with various sections. Section 210 may display device names, power measurements, models and/or other characteristic. Each section may represent an individual piece of equipment (or other subset of the rack). The size and dimensions may be representative of the actual physical hardware. Accordingly, a larger piece of hardware may be represented as larger than other devices in 210. A calculation of measured power may be displayed at 212. By selecting a specific device within 210, an interactive window may be displayed that provides device details, including inventory number, manufacturer, model, kW expected, hardware lifecycle, Age, etc. Chart 214 illustrates a power chart with historical data. In this example, graphic 215 demonstrates used power (in kW) and line 216 illustrates Derate Power. Other data and metrics may be illustrated. For example, data relating to CPU usage and memory data may be accessed to better understand the aggregated power data.

According to an exemplary embodiment, the system may illustrate power consumption for a particular device (or group of devices) for a time period, e.g., the past 30 days, etc. Section 217 provides information concerning power measurements, including latest reading, average power, power variance etc., for the particular rack. This information may be generated in real time via an API. The DCOS Tool may receive data from various sources via an API and then generate calculations in real-time.

An embodiment of the present invention may also generate reports and alerts, provide trends and perform predictive analysis for various scenarios.

An embodiment of the present invention may auto generate a visual interpretation of a rack layout using database information rendered in SVG. The system may also visualize live and historical power for a given rack directly from a globally distributed power collector. The system may also visualize: Phase balancing; History; Trends; Comparable racks (using rack patterns) as well as other metrics and features.

An embodiment of the present invention may visualize service utilization within a rack on the same chart. For example, the system may plot real power, CPU and memory utilization figures on a configurable chart. Also, the system may plot real power from a specific rack on the same axis as the collected power trend of the pattern to compare how a rack matches up to the average for that pattern.

An embodiment of the present invention enables a user to view live fault tickets for devices within the rack. The system may enable physical identification of the rack by switching on/off lighting in the data center. The system may further physically unlock racks based on an authentication and API call from the tool, matching it up with an active fault ticket. Accordingly, each rack opened in a data center may be directly auditable against a fault ticket.

Figure 3:
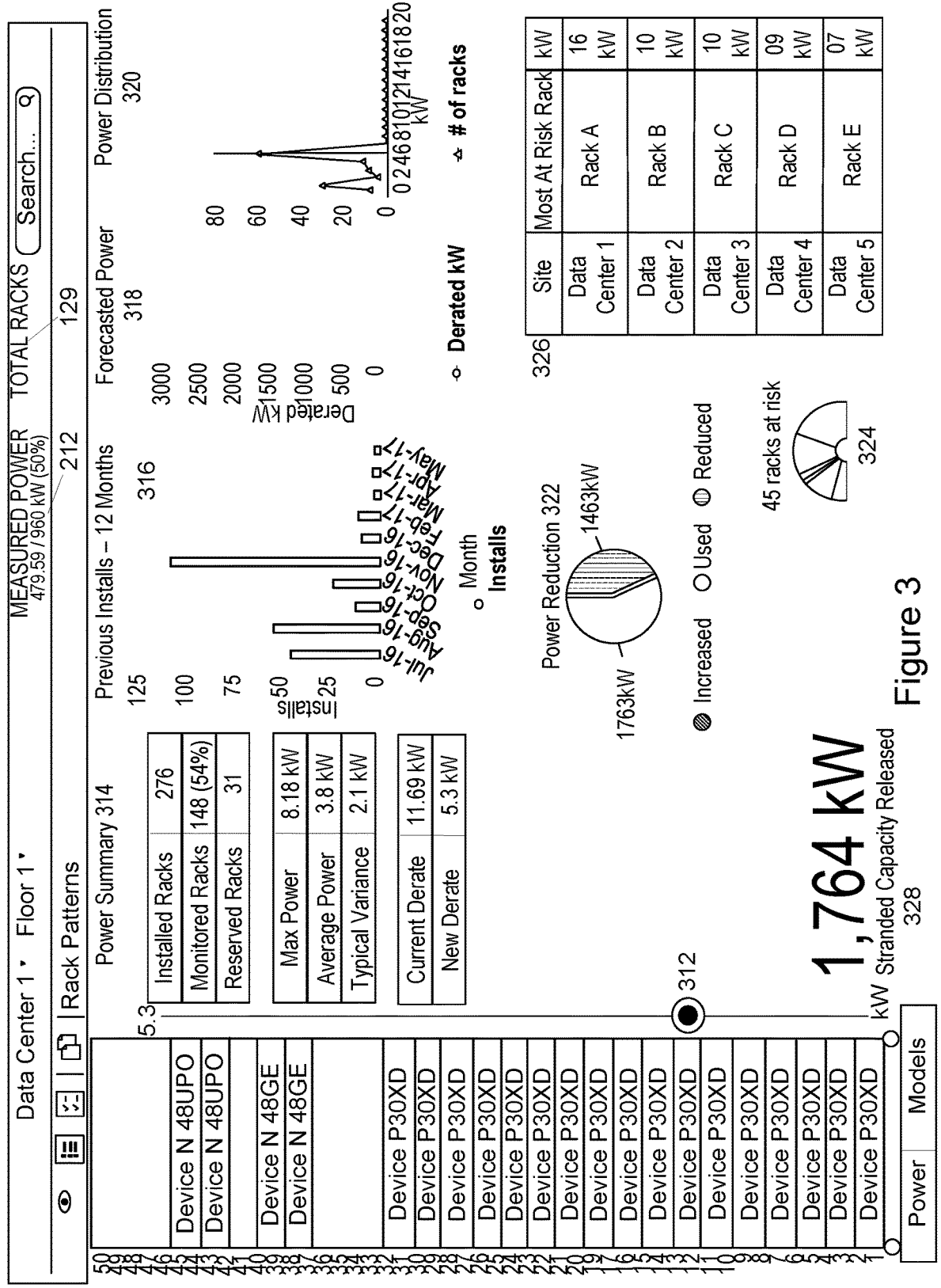
FIG. 3 an exemplary user interface that illustrates rack patterns and analytical information, according to an embodiment of the present invention.

FIG. 3 an exemplary user interface that illustrates rack patterns and analytical information, according to an embodiment of the present invention. An embodiment of the present invention is directed to grouping racks into patterns based on identical, similar and/or related hardware and application configurations.

As shown in FIG. 3, details concerning a particular device may be provided. 310 illustrates a rack view of a device with varying levels representing stacks, etc. Section 310 may display power measurements, models and/or other characteristic. A calculation of measured power may be displayed at 328. Section 314 illustrates a power summary. Section 316 provides details concerning previous installs over a predetermined time period, e.g., 12 months. Section 318 provides forecasted power. Section 320 illustrates power distribution. Section 322 illustrates a power reduction scenario. Section 324 identifies racks that are at risk (or other condition). Section 326 provides details concerning sites, most at risk racks and power measurement (in kW).

A user may interact with the system by moving button 312, for example. Other user interactive features may be implemented. This provides additional insight into planning purposes. By sliding the power bar using button 312, the system may recalculate measurements, including capacity at 328, power reduction at 322 and racks at risk 324. For example, a user may identify a power measurement that correlates to 0 or 1 rack at risk, as shown at 324. With this feature, users may view how much can be saved and how much risk is at stake under each scenario.

In this example, the Power measurement is shown to be 5.3 kW. Under this scenario, stranded capacity released is at 1,764 kW. Overall power reduction is illustrated at 322. At risk racks are at 45. In this scenario, most at risk racks are illustrated at 326, by Site, rack identifier and kW over.

In accordance with the various embodiments of the present invention, every deployed rack may become part of a "pattern" within a DCOS database which performs collective measurements and trending against all of them. The system may use collected power data for each rack to identify trends in the pattern and present them to users when new racks are being installed. For example, an embodiment of the present invention may recognize that power usage is heaviest during a time period (e.g., 9 am-10 am window) or based on an event (e.g., after being installed it takes five months before a rack gets to average power usage). The system may also warn users if there is growth across the pattern that peaks higher than the acceptable physical limit in other site (e.g., site A limit is 10 kW, site B limit is 5 kW). For example, the system may identify a pattern average of 7 kW. If the user wants to install in site B, the system may identify a warning.

An embodiment of the present invention may recommend which numbers should actually be used for planning future installs based on an aggregated pattern data.

For example, an embodiment of the present invention may aggregate devices together (e.g., cabinets, etc.) and view the data on an aggregated level. As shown in Power Summary 314, there are 276 racks installed and about half of them (148, or 54%) are being monitored. As indicated in Power Summary 314, maximum power is 8.18 kW and an average power is 3.8 kW. For example, a user may then slide the button 312 to 3.5 kW and provide insight as to new install planning.

When a pattern is first created, e.g., Pattern 1, an embodiment of the present invention may run load testing on the hardware to create an overall estimate power value for a rack, called the derate. In this example, the derate for Pattern 1 may be 10 kW.

Once the system begins to install instances of Pattern 1 globally, an embodiment of the present invention may collect real-time monitoring data within the DCOS Tool. This data may then be viewed, as illustrated in FIG. 3, as aggregate data points. The user may then run a scenario to reduce and/or increase the derate value to assess impact. Once the value has been altered to a point that reaches an acceptable count of racks at risk, say to 8 kW, then this may be saved and used for Pattern 1 going forward.

The user may view current installations of Pattern 1 and "release" any stranded power, in this case 2 kW for each instance. The user may also use the new derate value of 8 kW for planning purposes when a demand for Pattern 1 comes through the system.

The number, on the button 312 may represent a "derated kW," this may effectively be an amount of power reserved for each rack in the pattern. So in the data center, if a new rack is installed then 3.5 kW of power may be reserved for that rack and no other user or system will be able to use that power. If the user increases the number, then the overall power each rack has reserved may be increased (e.g., increase by 1 kW for 276 racks costs 276 kW in total). If the user decreases the number, then the power may be released for other functions to use in the data center. In this example, average power usage may be 3.8 kW for the pattern and "derated kW" or "reserved kW" may be 3.5 kW. Accordingly, if only 3.5 kW is provided to every rack, then some racks may not have enough power to run and be "at risk." The DCOS Tool enables users to model how much reserved power may be freed up in the data centers but also represent associated risks with freeing up that reserved power as the analytical data may allow existing capacity to be released.

However, at this level, the system may indicate a number of racks at risk. In this exemplary scenario, there may be 102 racks at risk. This enables users to safely adjust planning numbers to thereby improve efficiencies at data centers.

According to another example, a user may adjust button 312 to now read 6.7 kW. In this example, the system may indicate that there is 1 rack at risk and the rack at risk is operating 0.2 kW above the 6.7 kW.

An embodiment of the present invention may auto calculate potential savings and risks based on changes to planning numbers. For example, the system may determine how much total power that may be recovered if the user altered the reserved power numbers using a Recommendation Engine's suggestions to be closer to reality. The system may then realize those savings over every site or a subset of sites. For example, the system may install a slightly modified pattern and calculate predicted potential savings if it was deployed more widely. In addition, the system may identify "Risk racks" and outliers based on collected power data.

Figure 4:
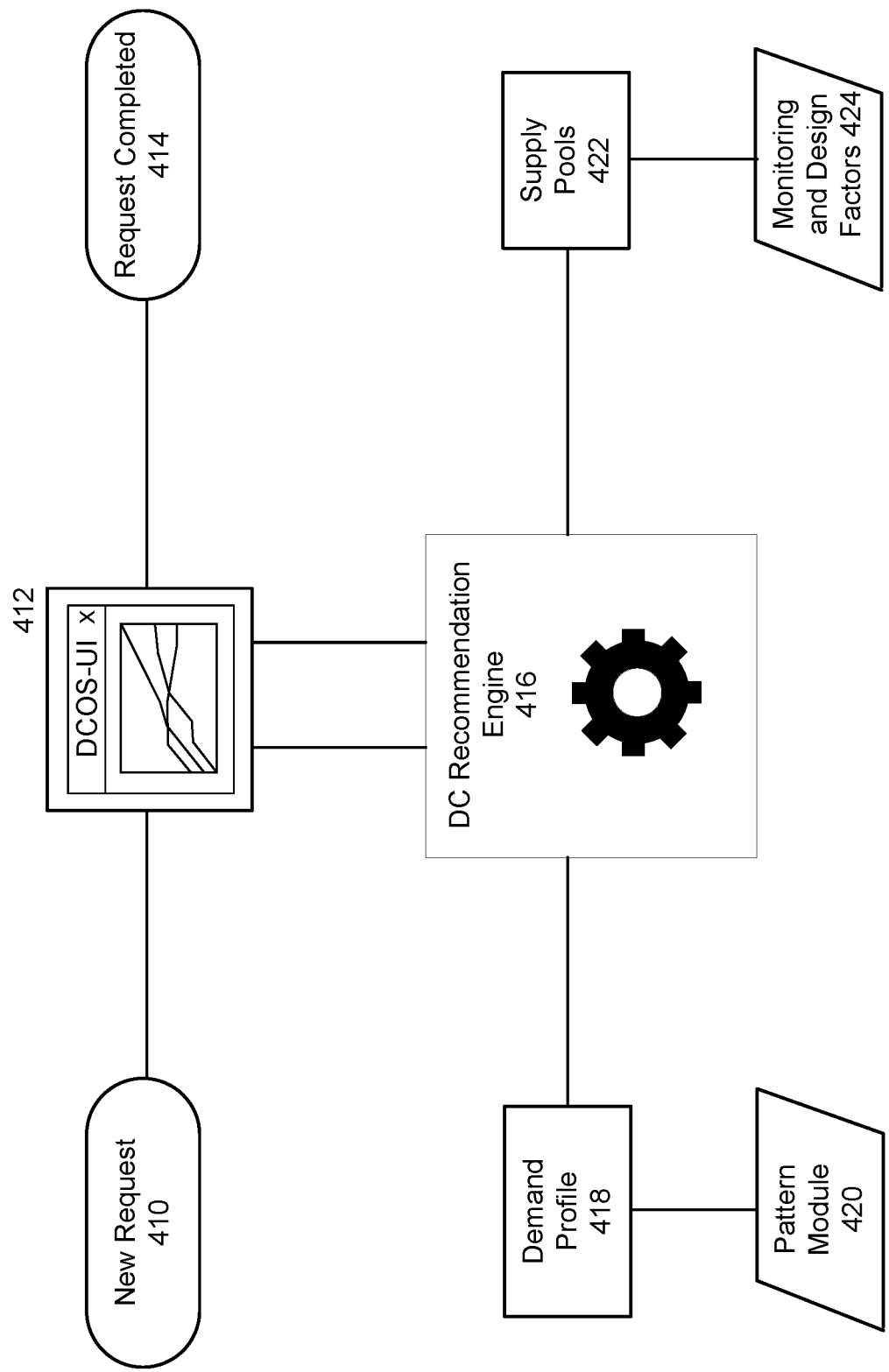
FIG. 4 an exemplary system that illustrates a recommendation engine, according to an embodiment of the present invention.

FIG. 4 an exemplary system that illustrates a recommendation engine, according to an embodiment of the present invention. According to an embodiment of the present invention, the DCOS system may handle change requests in a data center by leveraging a Recommendation Engine 416 to more efficiently consume data center assets.

As shown in FIG. 4, a new request 410 may be received at an input of user interface 412. Requests for changes within the data center may be made via integrated systems or manually raised within the DCOS system. Requests may relate to installing, changing, investigating or removing a piece(s) of equipment.

Requests and recommendations may be visualized and further made available to users via an interactive user interface, represented as DCOS UI 412.

Recommendation Engine 416 may receive inputs from Demand Profile 418, Pattern Module 420 as well as Supply Pools 422 and Monitoring and Design Factors 424.

Each request 410 may have an associated demand profile 418 which describes areas of the data center of which it will consume, along with quantities. These may be are categorized as: Power (e.g., kW draw, power supply count); Network (ports/ips); Physical space; Temperature considerations; Airflow direction; Historical trends (of similar equipment); Previous alarms or manual Alerts; as well as other predicted demand for similar equipment.

Each demand profile may be managed with a pattern module 420. The pattern module may highlight existing analysis on similar equipment to provide recommendations on what the resulting demand profile should be. This information may then be used as a reference for new requests as part of a Demand Profile step.

Recommendation Engine 416 may compare a demand profile for a request and match it against available supply pools. Recommendation Engine 416 may then evaluate an optimal and effective solution for a request based on maximizing utilization of data center assets.

Consumable areas of the data center may be grouped into Supply Pools, represented by 422. Supply Pools may include: Power breaker ratings and thresholds; Cooling Limits; Space Limits; Network Types; Cabling Areas; Data center aisle/row temperature limits, etc.

Recommendation Engine 416 may consider monitoring and design factors, represented by 424. For example, Supply Pools may be defined by a combination of design factors (e.g., cooling/power budgets) and monitoring points that describe the threshold or limitations of the data center.

Figure 5:
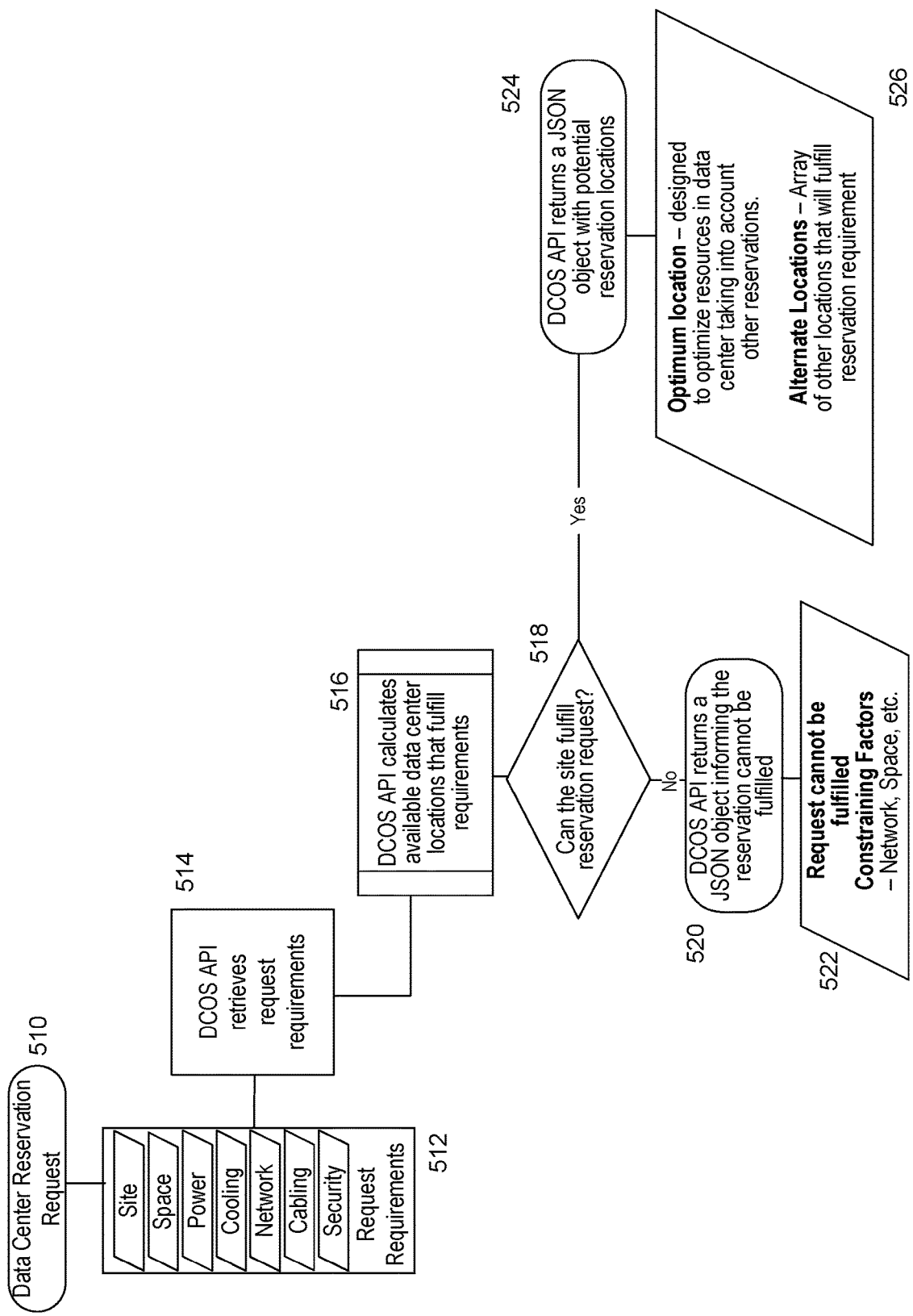
FIG. 5 is an exemplary flowchart for an auto-placement feature, according to an embodiment of the present invention.

FIG. 5 is an exemplary flowchart for an auto-placement feature, according to an embodiment of the present invention. As shown in FIG. 5, an embodiment of the present invention may automatically recommend a best or optimal location for equipment to be placed in a particular data center.

At 510, a data center request may be received. For example, the system may receive specifications for a type of hardware that needs to be placed. The specifications may include data relating to site, space, power, cooling, network, cabling, security and/or other requirements, data and preferences, represented by 512. Site data points may refer to location and space within a data center. Space data points may refer to an amount of physical space associated with the reservation. Power data points may refer to total power allocation. Cooling data points may refer to a volume of air for equipment (e.g., high, medium, low, etc.). Network data points may refer to distribution required (e.g., grid, etc.). Cabling data points may refer to upstream cabling requirements to cabling distribution (e.g., copper, multimode fiber, single mode fiber, etc.). Security data points may refer to colocation requirements or cabling locking requirements for WAN and other equipment.

At 514, DCOS API may retrieve requirements. The API of an embodiment of the present invention may run a number of customizable rules to find an optimal placement location, at 516. The system may determine whether the request can be fulfilled, at 518. Customizable rules may include restricting placement locations due to specific constraints at sites, encouraging placement locations that optimize cost and existing resources, etc. For example, a customizable rule may ensure if two instances of a services are requested then they will not be placed in the same area, fed by the same power source or share a single upstream network switch to maintain resiliency. The API may then return a recommended location to a requester or other user, at 524. The recommended location may include an optimum location, alternate locations and/or other options which may be based on various factors and considerations, such as space, cost, efficiency, proximity, etc., as shown by 526 If a particular request cannot be fulfilled, as determined by 520, the system may provide an explanation that includes constraining factors and/or other limitations and restrictions at 522. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented data center operating system comprising:
a memory component that stores inventory data for a plurality of data centers;
an interactive interface that receives one or more user inputs;
an API input that receives data from one or more data center systems;
and a processor, coupled to the API input, memory component and the interactive interface, the processor configured to perform the steps comprising:
receiving, via the API input, monitored data from a plurality of data centers at one or more locations, wherein the monitored data includes live power data;
automatically generating, via the processor, an interactive data center floorplan, drawn in scalable vector graphics via a JavaScript Object Notation object, that comprises: (i) one or more devices, (ii) the monitored data at a device-level for a specific data center, (iii) live color layering and live data pertaining to power utilization trends and device density, (iv) warning limits and breaches pertaining to power utilization, (v) real-time heat maps, and (vi) historical heat data;
making the one or more devices within interactive data center floorplan searchable from one or more SQL databases; and
displaying, via the interactive interface, a view region and a top bar, the top bar comprising a data center dropdown menu for selecting one of the data centers, a space or floor dropdown menu for selecting a space or floor within the selected data center, and information summarizing measurements for the selected space or floor of the selected data center;
displaying, in the view region, a bird's eye view of the interactive data center floorplan comprising a plurality of racks, each rack comprising a display of one or more devices with corresponding power measurements;
receiving a selection of a particular rack from the bird's eye view;
in response to receiving the selection of the particular rack, displaying a rack pattern view for the particular rack in the view region, the rack pattern view comprising:
a column with a plurality of groups, wherein each group is separated by one or more blank rows, and wherein each group includes one or more devices that conform to a respective criteria for that group,
a power bar comprising with a slidable button, and
detailed data for the particular rack in the specific data center, the detailed data comprising real-time power measurement, power recorded over an arbitrary period of time, electrical phase balance, power trending, local temperatures, local pressures, and local airflows;
receiving a user input moving the button along the power bar; and
in response to the user input moving the button along the power bar, recalculating measurements of capacity, power reduction, and racks at risk in accordance with a release of stranded capacity commensurate with the movement of the button.

2. The computer implemented system of claim 1, the processor further configured to perform the step of: for racks at risk corresponding to the racks at risk data, automatically generating site data, most at risk rack data and power overage data.

3. The computer implemented system of claim 1, further comprising:
a recommendation engine that receives a request for change and generates a response that maximizes utilization of data center assets.

4. The computer implemented system of claim 3, wherein the request for change has a corresponding demand profile that is managed by a pattern module that highlights existing analysis on corresponding equipment.

5. The computer implemented system of claim 3, wherein the recommendation engine receives data from a supply pool defined by a combination of design factors and monitoring points that identify limitations of a data center.

6. A computer implemented method that operates a data center system, the method comprising the steps of:
receiving, via an API input, monitored data from a plurality of data centers at one or more locations, and from one or more data center systems, wherein the monitored data includes live power data;
automatically generating, via a processor, an interactive data center floorplan, drawn in scalable vector graphics via a JavaScript Object Notation object, that populates the floorplan with: (i) one or more devices, (ii) the monitored data at a device-level for a specific data center, (iii) live color layering and live data pertaining to power utilization trends and device density, (iv)

warning limits and breaches pertaining to power utilization, (v) real-time heat maps, and (vi) historical heat data, wherein the processor is coupled to the API input, a memory component and an interactive interface;

making the one or more devices within interactive data center floorplan searchable from one or more SQL databases;

displaying, via an interactive interface, a view region and a top bar, the top bar comprising a data center dropdown menu for selecting one of the data centers, a space or floor dropdown menu for selecting a space or floor within the selected data center, and information summarizing measurements for the selected space or floor of the selected data center;

displaying, in the view region, a bird's eye view of the interactive data center floorplan comprising a plurality of racks, each rack comprising a display of one or more devices with corresponding power measurements;

receiving, via the interactive interface, a selection of a particular rack from the bird's eye view;

in response to receiving the selection of the particular rack, displaying a rack pattern view for the particular rack in the view region, the rack pattern view comprising:
 a column with a plurality of groups, wherein each group is separated by one or more blank rows, and wherein each group includes one or more devices that conform to a respective criteria for that group,
 a power bar comprising with a slidable button, and
 detailed data for the particular rack in a particular data center, the detailed data comprising real-time power measurement, power recorded over an arbitrary period of time, electrical phase balance, power trending, local temperatures, local pressures, and local airflows;

receiving a user input via the interactive interface moving the button along the power bar; and in response to the user input moving the button along the power bar, recalculating measurements of capacity, power reduction, and racks at risk in accordance with a release of stranded capacity commensurate with the movement of the button.

7. The computer implemented method of claim 6, further comprising the step of: for the racks at risk, automatically generating site data, most at risk rack data and power overage data.

8. The computer implemented method of claim 6, further comprising the step of:
 receiving, via a recommendation engine, a request for change and generating a response that maximizes utilization of data center assets.

9. The computer implemented method of claim 8, wherein the request for change has a corresponding demand profile that is managed by a pattern module that highlights existing analysis on corresponding equipment.

10. The computer implemented method of claim 8, wherein the recommendation engine receives data from a supply pool defined by a combination of design factors and monitoring points that identify limitations of a data center.

* * * * *